United States Patent
Choi et al.

(10) Patent No.: US 7,599,979 B2
(45) Date of Patent: Oct. 6, 2009

(54) APPARATUS FOR HYBRID MULTIPLIER IN GF($2^m$) AND METHOD THEREOF

(75) Inventors: Yong Je Choi, Gwangjoo (KR); Ku Young Chang, Daejeon (KR); Do Won Hong, Daejeon (KR); Hyun Sook Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 773 days.

(21) Appl. No.: 11/046,340

(22) Filed: Jan. 28, 2005

(65) Prior Publication Data

US 2006/0095495 A1 May 4, 2006

(30) Foreign Application Priority Data

Oct. 29, 2004 (KR) .................. 10-2004-0087044

(51) Int. Cl.
*G06F 7/72* (2006.01)
(52) U.S. Cl. .................................................. 708/492
(58) Field of Classification Search ................ 708/492
See application file for complete search history.

(56) References Cited

U.S. PATENT DOCUMENTS

| 4,697,248 | A | | 9/1987 | Shirota | |
|---|---|---|---|---|---|
| 6,044,390 | A | * | 3/2000 | Golnabi et al. | 708/492 |
| 7,133,889 | B2 | * | 11/2006 | Parthasarathy et al. | 708/492 |
| 2002/0138534 | A1 | * | 9/2002 | Drescher | 708/492 |
| 2003/0093450 | A1 | * | 5/2003 | Chen | 708/492 |
| 2005/0033790 | A1 | * | 2/2005 | Hubert | 708/492 |

FOREIGN PATENT DOCUMENTS

KR      1020010068349 A    7/2001

OTHER PUBLICATIONS

Y.J. Choi et al., "Hybrid Multiplier for FG($2^m$) defined by some irreducible trinomials", Electronics Letters, Jul. 8, 2004, vol. 40, No. 14 (pp. 852-853).
B. Sunar et al., Brief Contributions "Mastrovito Multiplier for All Trinomials", IEEE Transactions on Computers, vol. 48, No. 5, May 1999 (pp. 522-527).

* cited by examiner

*Primary Examiner*—David H Malzahn
(74) *Attorney, Agent, or Firm*—Blakely, Sokoloff, Taylor & Zafman LLP

(57) ABSTRACT

An apparatus and method for hybrid multiplication in GF($2^m$) by which trade-off between the area and the operation speed of an apparatus for a hybrid multiplier in finite field GF($2^m$) can be achieved are provided. The apparatus for hybrid multiplication includes: a matrix Z generation unit generating [m×k] matrix Z for performing a partial multiplication of a(x) and b(x), by dividing b(x) by k bits ($k \leq \lceil m/2 \rceil$), when multiplication of m-bit multiplier a(x) and m-bit multiplicand b(x) is performed from [(m+k−1)×k] coefficient matrix of a(x) in GF($2^m$); a partial multiplication unit performing the partial multiplication $\lceil m/k \rceil k-1$ times in units of rows of the matrix Z to calculate an ($\lceil m/k \rceil k-1$)-th partial multiplication value and a final result value of the multiplication; and a reduction unit receiving the ($\lceil m/k \rceil k-1$)-th partial multiplication value fed back from the partial multiplication unit and performing reduction of the value in order to obtain a partial multiplication value next to the ($\lceil m/k \rceil k-1$)-th partial multiplication value.

5 Claims, 9 Drawing Sheets ved embodiments of the present invention are referred to in order to gain a sufficient understanding of the present invention, the merits# APPARATUS FOR HYBRID MULTIPLIER IN GF($2^m$) AND METHOD THEREOF This application claims the priority of Korean Patent Application No. 10-2004-0087044, filed on Oct. 29, 2004 in the Korean Intellectual Property Office, the disclosure of which is incorporated herein in its entirety by reference.

BACKGROUND OF THE INVENTION

1. Field of the Invention

The present invention relates to an apparatus for hybrid multiplication, and more particularly, to an apparatus for hybrid multiplication in finite field GF($2^m$) capable of achieving trade-off between the area and the performance of an apparatus for multiplication.

2. Description of the Related Art

A variety of operations in GF($2^m$) are widely used in communications systems or public-key cryptosystems. The GF($2^m$) operation in communication systems is used to enhance the reliability of information and m is determined with respect to the amount of data to be guaranteed for reliability. The exponent m has close relation with the size of hardware for calculation. For communication systems, m in a range from 8 to 32 is used, and a basic calculator for this, such as an adder, a multiplier, an inverse multiplier, is relatively easily implemented.

Meanwhile, in public-key cryptosystems, m is determined according to a guaranteed security, and in case of an elliptic curve cryptosystem (ECC), in order to guarantee sufficient security, m of 160 or over is recommended. Thus, for large m, the area as well as the performance of hardware should be considered. In particular, in case of a multiplier taking a major part of public-key cryptosystem calculations, the difference between the performance and the area can increase depending on the implementation method, and consequently, the difference of the performance of the entire system can increase.

An apparatus for multiplication in GF($2^m$) can be designed by a bit-serial method or a bit-parallel method. The bit-serial method has an advantage of hardware implementation with a small area, but the operation should be repeatedly performed m or more times such that the operation time increases and the performance of the system can be lowered. Meanwhile, the bit-parallel method can be expected to provide a high-speed operation performance, but with increasing m, the area of the hardware increases by a factor of 2 such that in case of a large system, there is difficult in implementation.

SUMMARY OF THE INVENTION

The present invention provides an apparatus and method for hybrid multiplication in finite field GF($2^m$) capable of achieving trade-off between the area and the performance of an apparatus for multiplication with optimizing the operation in finite field GF($2^m$).

According to an aspect of the present invention, there is provided an apparatus for hybrid multiplication including: a matrix Z generation unit generating [m×k] matrix Z for performing a partial multiplication of a(x) and b(x), by dividing b(x) by k bits (k≦⌈m/2⌉), when multiplication of m-bit multiplier a(x) and m-bit multiplicand b(x) is performed from [(m+k−1)×k] coefficient matrix of a(x) in GF($2^m$); a partial multiplication unit performing the partial multiplication ⌈m/k⌉k−1 times in units of rows of the matrix Z to calculate an (⌈m/k⌉k−1)-th partial multiplication value and a final result value of the multiplication; and a reduction unit receiving the (⌈m/k⌉k−1)-th partial multiplication value fed back from the partial multiplication unit and performing reduction of the value in order to obtain a partial multiplication value next to the (⌈m/k⌉k−1)-th partial multiplication value.

According to another aspect of the present invention, there is provided a hybrid multiplication method for multiplication of m-bit multiplier a(x) and m-bit multiplicand b(x) in GF($2^m$) including: generating [m×k] matrix Z for performing a partial multiplication of a(x) and b(x), by dividing b(x) by k bits (k≦⌈m/2⌉); by performing the partial multiplication ⌈m/k⌉k−1 times in units of rows of the matrix Z, calculating an (⌈m/k⌉k−1)-th partial multiplication value and a final result value of the multiplication; and reducing the obtained (⌈m/k⌉k−1)-th partial multiplication value in order to obtain a partial multiplication value next to the (⌈m/k⌉k−1)-th partial multiplication value.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1A:
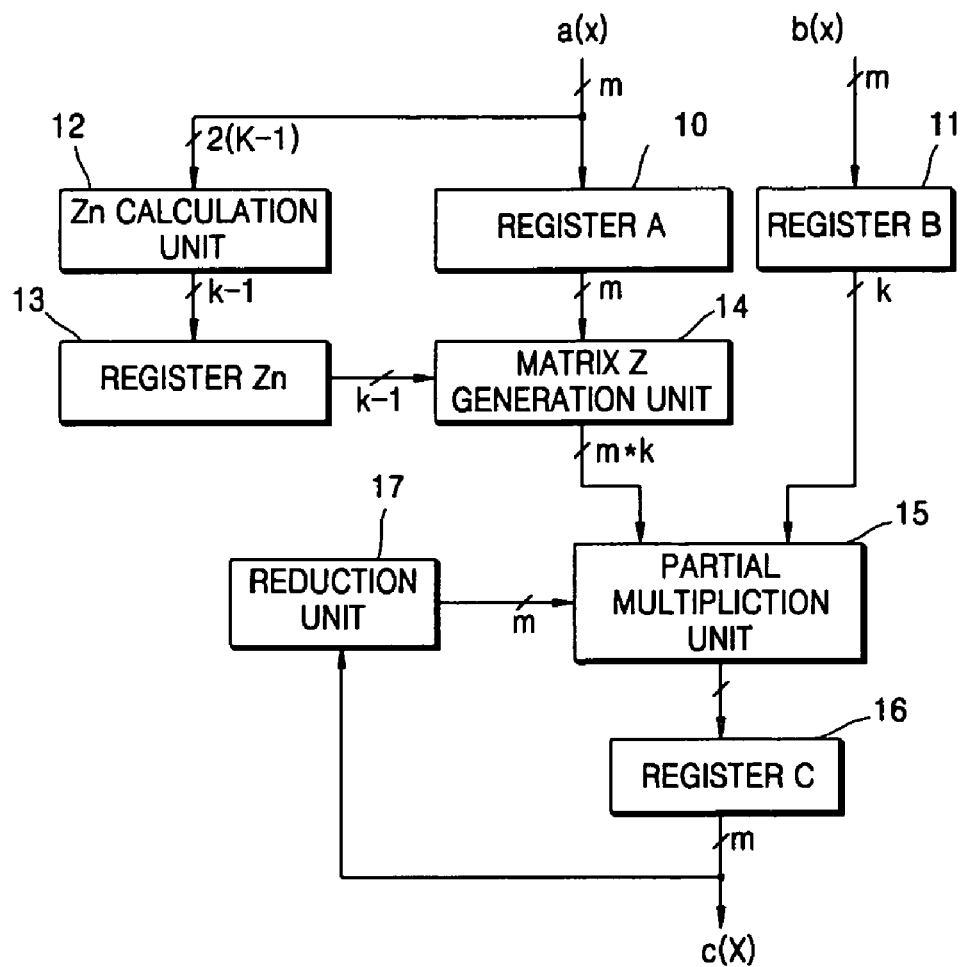
FIG. 1A is a diagram of the structure of a preferred embodiment of an apparatus of the present invention.

The attached drawings for illustrating preferred embodiments of the present invention are referred to in order to gain a sufficient understanding of the present invention, the merits thereof, and the objectives accomplished by the implementation of the present invention. Hereinafter, the present invention will be described in detail by explaining preferred embodiments of the invention with reference to the attached drawings. In the drawings, whenever the same element reappears in subsequent drawings, it is denoted by the same reference numeral.

The present invention is designed to solve the problem of the multiplication methods described above. The present invention provides an apparatus and method for hybrid multiplication in finite field GF($2^m$) capable of achieving trade-off between the area and the performance of an apparatus for multiplication with optimizing the operation in finite field GF($2^m$).

For convenience of understanding, the implementation process of multiplication according to the present invention will now be explained considering the numerical formula aspect of the process.

Assuming that $f(x)=x^m+x^n+1$ ($1 \leq n \leq m/2$) is an irreducible polynomial in $GF(2^m)$, an arbitrary element, $a(x)$, in $GF(2^m)$ can be expressed as $$a(x) = \sum_{i=0}^{m-1} a_i x^i,$$

$a_i \in GF(2^m)$.

Here, the irreducible polynomial under condition $n \geq m/2$ is a form of a irreducible polynomial recommended in the standards such as SEC, WTLS, ISO, NIST, and FIPS.

Assuming that $$b(x) = \sum_{i=0}^{k-1} b_i x^i$$

(k>m), if partial multiplication of an m-bit multiplier, $a(x)$, and an arbitrary k-bit multiplicand, $b(x)$, is considered, the partial multiplication $d(x)$ of $a(x)$ and $b(x)$ can be expressed as the following equation 1, and can also be expressed by using a [m+k−1]-row coefficient matrix M:

$$d(x) = a(x)b(x) = \sum_{i=0}^{m+k-2} d_i x^i \quad (1)$$

$$\begin{bmatrix} d_0 \\ d_1 \\ \vdots \\ d_{k-1} \\ d_k \\ \vdots \\ d_{m-1} \\ d_m \\ \vdots \\ d_{m+k-2} \end{bmatrix} = \begin{bmatrix} a_0 & 0 & 0 & \cdots & 0 & 0 \\ a_1 & a_0 & 0 & \cdots & 0 & 0 \\ \vdots & \vdots & \vdots & \cdots & \vdots & \vdots \\ a_{k-1} & a_{k-2} & a_{k-3} & \cdots & a_1 & a_0 \\ a_k & a_{k-1} & a_{k-2} & \cdots & a_2 & a_1 \\ \vdots & \vdots & \vdots & \cdots & \vdots & \vdots \\ a_{m-1} & a_{m-2} & a_{m-3} & \cdots & a_{m-k+1} & a_{m-k} \\ 0 & a_{m-1} & a_{m-2} & \cdots & a_{m-k+2} & a_{m-k+1} \\ \vdots & \vdots & \vdots & \cdots & \vdots & \vdots \\ 0 & 0 & 0 & \cdots & 0 & a_{m-1} \end{bmatrix} \begin{bmatrix} b_0 \\ b_1 \\ b_2 \\ \vdots \\ b_{k-1} \end{bmatrix}$$

Since $d(x)$ includes terms having a higher order than [m−1], it can be reduced to the [m−1]-th order by using $x^m = x^n+1$. Assuming $k \leq \lceil m/2 \rceil$, the highest order term $x^{m+k-2}$ of $d(x)$ satisfies the following equation 2:

$$x^{m+k-2} = x^{k-2}(x^n+1) = x^{n+k-2}+x^{k-2} (n+k-2 \leq m/2+\lceil m/2 \rceil-2 < m) \quad (2)$$

That is, if $k \leq \lceil m/2 \rceil$, reduction is performed only once for each of terms of the m-th or higher order of $d(x)$.

By this reduction, each row element $d_{m+j}$ ($0 \leq j \leq k-2$) of the matrix M is added once to $d_{n+j}$ and $d_j$. Assuming that Z denotes an [m×k] matrix obtained from matrix M after the reduction, matrix Z is formed as the sum of three matrices X, T, and U, that is, Z=X+T+U. Here, matrix X is a matrix formed by obtaining 1st through m-th rows of matrix M and matrix T is a matrix formed by obtaining the (m+1)-th and higher rows of matrix M and extending the remaining rows with 0's. Matrix U is formed by shifting matrix T down by n rows and filling 0's in the upper n rows. The three matrices are as the following:

$$X = \begin{bmatrix} a_0 & 0 & 0 & \cdots & 0 & 0 \\ a_1 & a_0 & 0 & \cdots & 0 & 0 \\ \vdots & \vdots & \vdots & \cdots & \vdots & \vdots \\ a_{k-1} & a_{k-2} & a_{k-3} & \cdots & a_1 & a_0 \\ a_k & a_{k-1} & a_{k-2} & \cdots & a_2 & a_1 \\ \vdots & \vdots & \vdots & \cdots & \vdots & \vdots \\ a_{m-1} & a_{m-2} & a_{m-3} & \cdots & a_{m-k+1} & a_{m-k} \end{bmatrix},$$

$$T = \begin{bmatrix} 0 & a_{m-1} & a_{m-2} & \cdots & a_{m-k+2} & a_{m-k+1} \\ 0 & 0 & a_{m-1} & \cdots & a_{m-k+3} & a_{m-k+2} \\ \vdots & \vdots & \vdots & \cdots & \vdots & \vdots \\ 0 & 0 & 0 & \cdots & 0 & a_{m-1} \\ 0 & 0 & 0 & \cdots & 0 & 0 \\ \vdots & \vdots & \vdots & \cdots & \vdots & \vdots \\ 0 & 0 & 0 & \cdots & 0 & 0 \end{bmatrix}$$

$$U = \begin{bmatrix} 0 & 0 & 0 & \cdots & 0 & 0 \\ \vdots & \vdots & \vdots & \cdots & \vdots & \vdots \\ 0 & 0 & 0 & \cdots & 0 & 0 \\ 0 & a_{m-1} & a_{m-2} & \cdots & a_{m-k+2} & a_{m-k+1} \\ 0 & 0 & a_{m-1} & \cdots & a_{m-k+3} & a_{m-k+2} \\ \vdots & \vdots & \vdots & \cdots & \vdots & \vdots \\ 0 & 0 & 0 & \cdots & 0 & a_{m-1} \\ \vdots & \vdots & \vdots & \cdots & \vdots & \vdots \\ 0 & 0 & 0 & \cdots & 0 & 0 \end{bmatrix} \begin{matrix} 0th\ \text{row} \\ \\ \\ n\text{-}th\ \text{row} \\ \\ \\ (n+k-2)\text{-}th\ \text{row} \end{matrix}$$

Due to predetermined regularity, an arbitrary i-th row $Z_i$ of matrix Z can be obtained by signal line mapping without adding an additional logic gate. The n-th row $Z_n$ of matrix Z is calculated as the following equation 3:

$Z_n = (a_n a_{n-1} \ldots a_0 a_{m-1} a_{m-2} \ldots a_{m-k+n+1}) + (0 a_{m-1} \ldots a_{m-k+1})$ if n<k $Z_n = (a_n a_{n-1} \ldots a_{n-k+1}) + (0 a_{m-1} \ldots a_{m-k+1})$ if $n \geq k$ \quad (3)

The partial multiplication of $a(x)$ and $b(x)$ is calculated as matrix multiplication of matrix Z and $b(x)$. By using this partial multiplication and considering two m-bit multiplications, it is assumed that $$a(x) = \sum_{i=0}^{m-1} a_i x^i, \text{ and } b(x) = \sum_{i=0}^{m-1} b_i x^i.$$

In order to calculate $a(x)b(x) \bmod f(x) = c(x)$ that is the multiplication result of $a(x)$ and $b(x)$, reduction matrix Z is generated and then $b(x)$ is divided into k bits according to the following equation 4:

$$b(x) = \sum_{i=0}^{k-1} b_i x^i + \sum_{i=k}^{2k-1} b_i x^i + \ldots + \sum_{i=(\lceil m/k \rceil-1)k}^{m-1} b_i x^i$$

-continued $$= \sum_{i=0}^{k-1} b_i x^i + \sum_{i=k}^{2k-1} b_i x^i + \ldots + \sum_{i=(\lceil m/k \rceil - 1)k}^{\lceil m/k \rceil k - 1} b_i x^i$$

$$= T_0 + T_1 + \ldots + T_{\lceil m/k \rceil - 1}$$

$$T_j = \sum_{i=jk}^{(j+1)k-1} b_i x^i = x^{jk} \sum_{i=0}^{k-1} b_{i+jk} x^i$$

Here, $b_i=0$ ($m \geq i < \lceil m/k \rceil k$).

Assuming $s=\lceil m/k \rceil - 1$, by using matrix Z, it can be seen that $$a(x)T_s = x^{sk} a(x) \sum_{i=0}^{k-1} b_{i+jk} x^i = x^{sk} \sum_{i=0}^{m-1} c_i x^i.$$

As for $a(x)T_{s-1}$, k-bit reduction is performed as the following equation 5 and this is added when $a(x)T_{s-1}$ is calculated:

$$a(x)T_s = x^{(s-1)k} \sum_{i=0}^{k-1} c_i x^{i+k} = x^{(s-1)k} \left( \sum_{i=k}^{m-1} c_{i-k} x^i + \sum_{i=m}^{m-1+k} c_{i-k} x^i \right) \quad (5)$$

$$= x^{(s-1)k} \left( \sum_{i=k}^{m-1} c_{i-k} x^i + \sum_{i=0}^{k-1} c_{i+m-k} x^{i+m} \right)$$

$$= x^{(s-1)k} \left( \left( \sum_{i=k}^{m-1} c_{i-k} x^i + \sum_{i=0}^{k-1} c_{i+m-k} x^{i+m} \right) + \sum_{i=0}^{k-1} c_{i+m-k} x^{i+n} \right)$$

Since this reduction process can be performed in parallel when the partial multiplication of $a(x)T_{s-1}$ is performed, the calculation time is not delayed. As described above, the multiplication in finite field $GF(2^m)$ in the present invention is performed by repeatedly performing this k-bit partial multiplication and reduction from j=s to j=0.

The method for performing the multiplication described above will now be explained with reference to attached drawings.

Figure 1B:
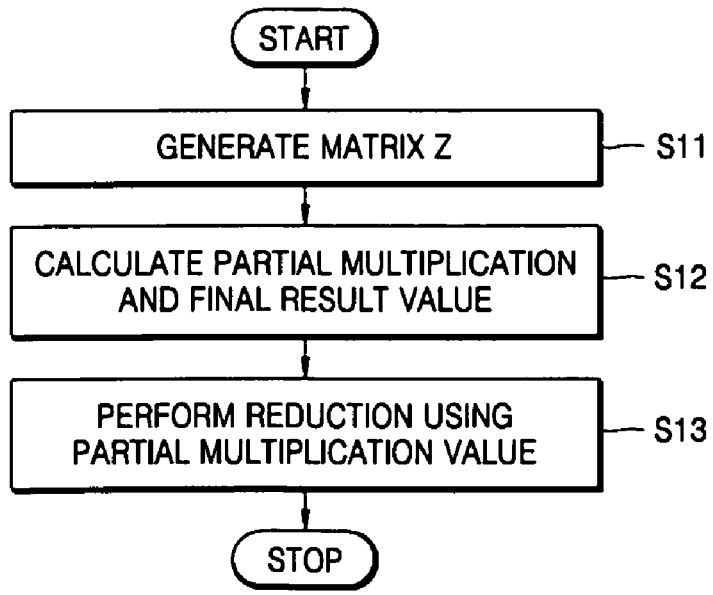
FIG. 1B is a flowchart of the operations performed by a preferred embodiment of a method of the present invention.

FIG. 1A is a diagram of the structure of a preferred embodiment of the present apparatus invention and FIG. 1B is a flowchart of the operations performed by a preferred embodiment of the present method invention.

As showing in FIG. 1A, the structure of the embodiment of the apparatus provided by the present invention includes: register A 10 storing m-bit multiplier a(x), register B 11 storing m-bit multiplicand b(x), $Z_n$ calculation unit 12 calculating the n-th row of matrix Z in advance, register $Z_n$ 13 storing $Z_n$ that is calculated in advance, a matrix Z generation unit 14 generating matrix Z by using $Z_n$ and a(x), a partial multiplication unit 15 performing partial multiplication of matrix Z and b(x), register C 16 storing the result value d(x) of partial multiplication, and a reduction unit 17 performing reduction of the partial multiplication result value and adding to the next partial multiplication value.

The details of the multiplication method shown in FIGS. 1A and 1B will now be explained with reference to FIGS. 2 through 6.

Multiplier a(x) and multiplicand b(x) input are stored in register A 10 and register B 11, respectively. Register A 10 stores the m-bit input and outputs this as is and register B 11 stores the m-bit input and outputs high-order k-bit values each time.

Figure 2:
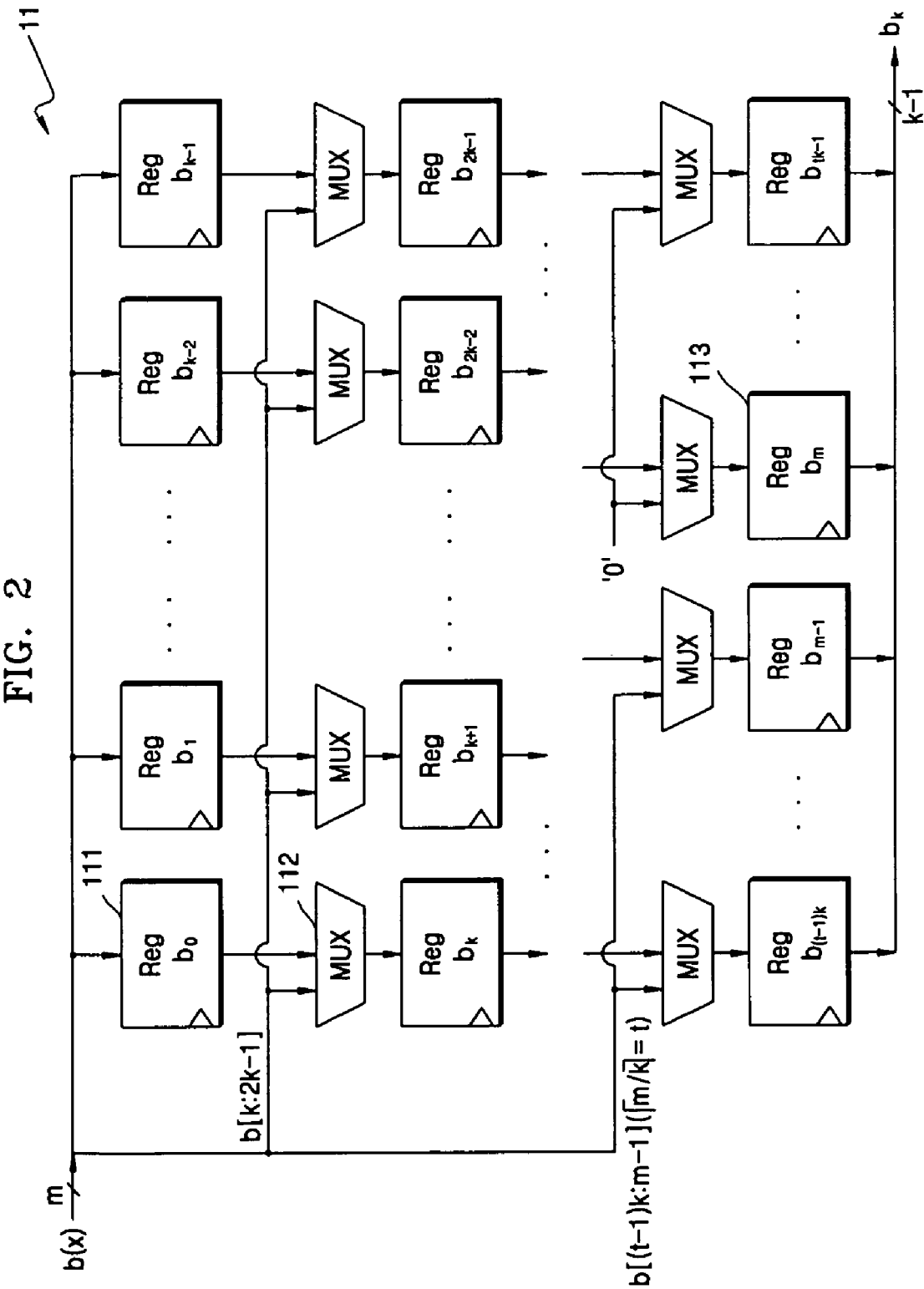
FIG. 2 is a diagram showing a detailed structure of register B shown in FIG. 1A.

FIG. 2 is a diagram showing a detailed structure of register B shown in FIG. 1A. Register B 11 is formed with $\lceil m/k \rceil k$ registers 111 storing input values and when a multiplication is performed, performing shift operations of stored values and multiplexers (MUX) 112 selecting between input values and shift register inputs. When an m-bit input value is stored in register B 11, according to the equation 4, the input value is divided into k-bit units and stored, values between m and $\lceil m/k \rceil k$ are stored as 0's. After that time, if a multiplication begins, $b_k$ values of stored high order k bits are output and in registers 111 and 113, a shift operation is performed in units of k bits $\lceil m/k \rceil k - 1$ times.

When multiplier a(x) and multiplicand b(x) are stored in register A 10 and register B 11, $Z_n$, the n-th row value of matrix Z repeatedly used in multiplication is calculated in $Z_n$ calculation unit 12 and stored in register $Z_n$ 13.

Figure 3:
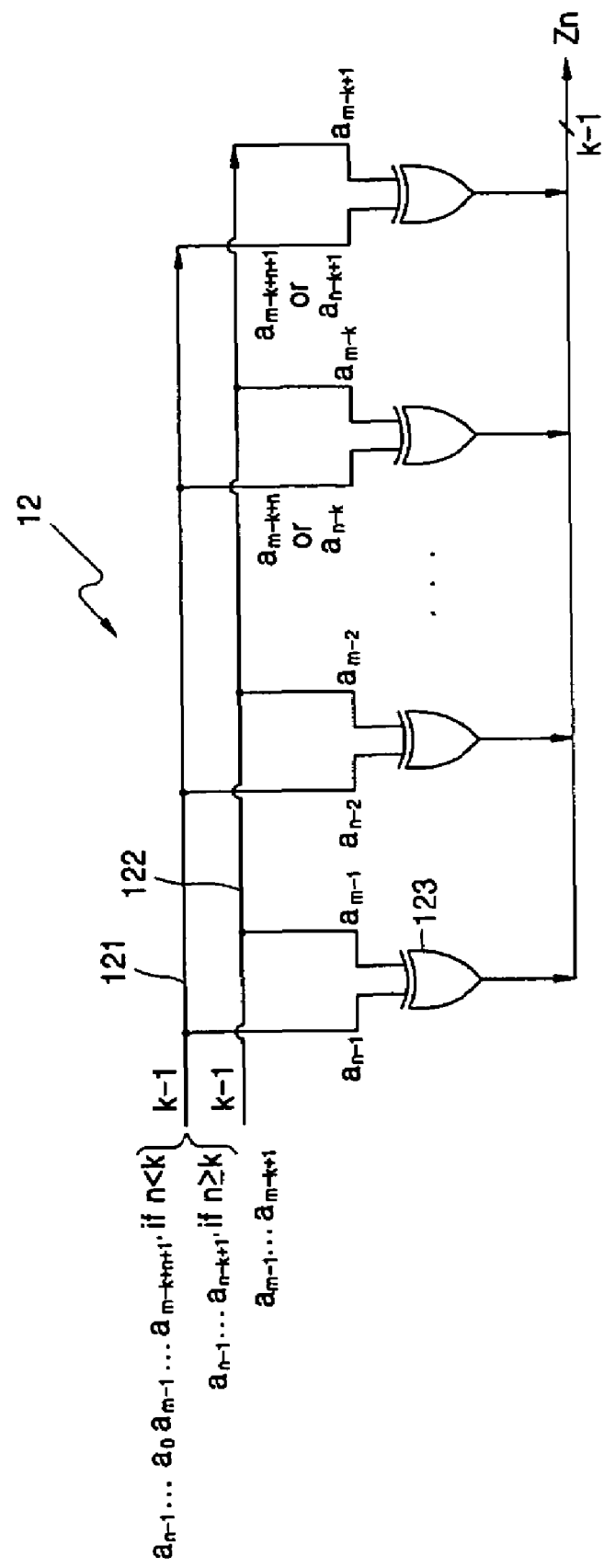
FIG. 3 is a diagram showing a detailed structure of $Z_n$ calculation unit shown in FIG. 1A.

FIG. 3 is a diagram showing a detailed structure of $Z_n$ calculation unit 12 shown in FIG. 1A. $Z_n$ calculation unit 12 is formed with [k-1] XOR operation units 123, and performs XOR operations, as shown in equation 3, of input values 121 and 122 selected among multiplier input values according to n and k values. The calculation result value $Z_n$ is stored in register $Z_n$ 13 and is repeatedly used in multiplication operations. Register Zn 13 is formed with registers having [k-1] bit inputs and outputs.

Figure 7:
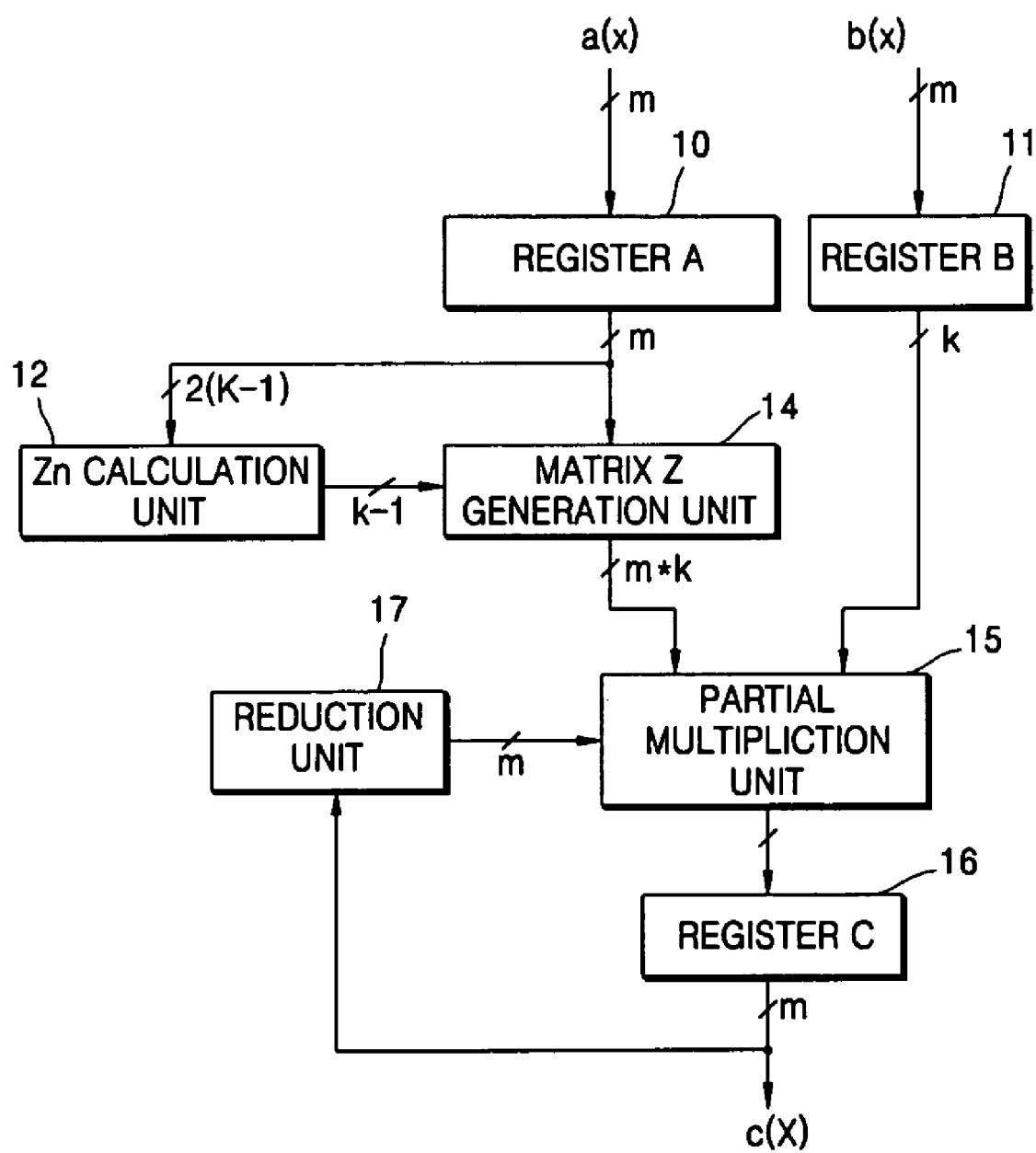
FIG. 7 is a diagram of the structure of another preferred embodiment of the present invention.

When necessary, without being stored in register $Z_n$ 13, the calculation result value of the n-th row of matrix Z may be directly calculated from the output value of the $Z_n$ calculation unit 12 and a multiplication can be performed. This has an advantage of reducing a hardware element required for the register $Z_n$ 13 because the register is not needed. FIG. 7 is a diagram of the structure of an embodiment of an apparatus for hybrid multiplication in $GF(2^m)$ not using register $Z_n$ 13. This structure is basically the same as that of the apparatus shown in FIG. 1, but the calculation result value of the n-th row of matrix Z is input directly to the matrix Z generation unit 14 without being stored in register $Z_n$ 13.

Figure 4:
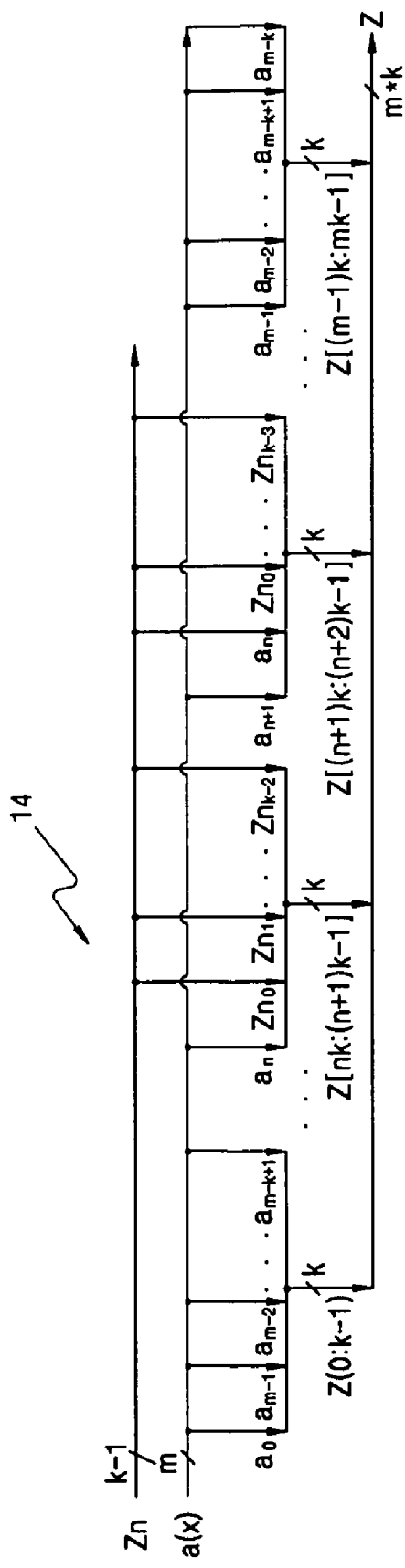
FIG. 4 is a diagram showing a detailed structure of a matrix Z generation unit shown in FIG. 1A.

FIG. 4 is a diagram showing a detailed structure of the matrix Z generation unit shown in FIG. 1A.

Matrix Z is generated by using the calculation result value, $Z_n$, of the n-th row of matrix Z, and multiplier a(x) stored in register A 10 in operation S11. Due to predetermined regularity as described above, matrix Z, as shown in FIG. 4, is implemented by signal line mapping without a separate logic. By repeatedly using the [k-1]-bit output of register $Z_n$ 13 and the m-bit output of register 10, each element value of the [m×k] bit matrix Z is generated.

Figure 5A:
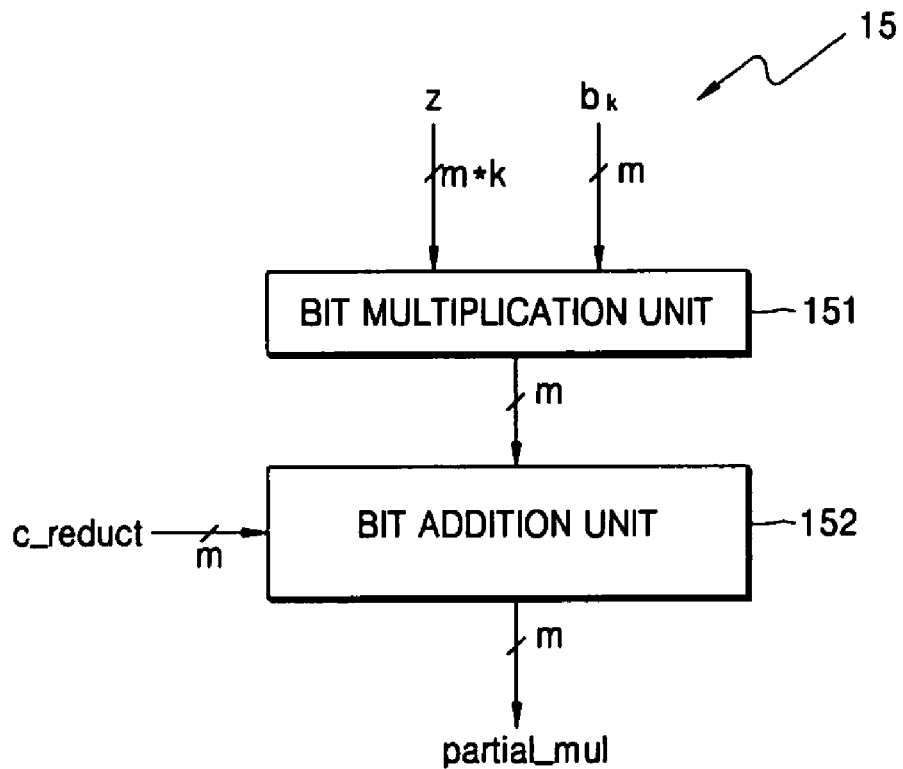
FIG. 5A is a diagram of the structure of a partial multiplication unit shown in FIG. 1A.
Figure 5B:
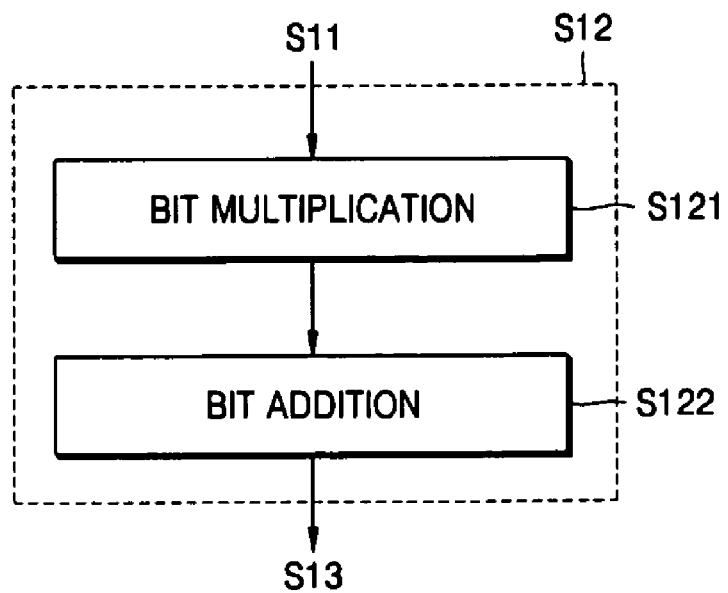
FIG. 5B is a flowchart of the operations performed in a partial multiplication operation shown in FIG. 1B.

FIG. 5A is a diagram of the structure of the partial multiplication unit shown in FIG. 1A, and FIG. 5B is a flowchart of the operations performed in the partial multiplication operation shown in FIG. 1B.

If each element value of matrix Z is generated, partial multiplication of this value and the output value, $b_k$, of register B 11 is performed in the partial multiplication unit 15 in operation S12.

The partial multiplication unit 15 is formed with a bit multiplication unit 151 performing bit multiplication of the [m×k] bit output of the matrix Z generation unit 14 and k-bit output $b_k$ of register B 11, and a bit addition unit 152 calculating partial multiplication result value partial_mul by performing bit addition of row elements of the bit multiplication result value and bit addition of reduced values of the pre-calculated partial multiplication results.

Figure 5C:
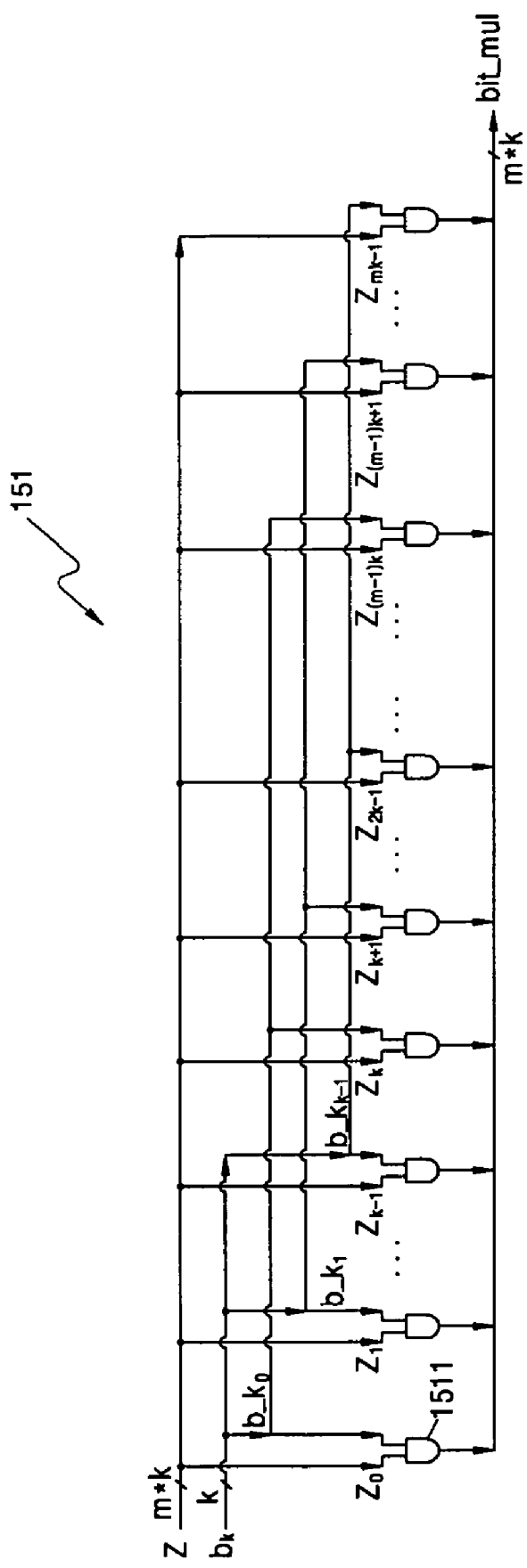
FIG. 5C is a diagram showing a detailed structure of a bit multiplication unit shown in FIG. 5A.

FIG. 5C is a diagram showing a detailed structure of the bit multiplication unit 151 shown in FIG. 5A. The bit multiplication unit 151 is formed with [m×k] AND operation units 1511 and performs bit multiplication of m rows of matrix Z by each bit of a k-bit output of register B 11 in operation S121. Bit addition of each row element of the bit multiplication result values, bit_mul, is performed in the bit addition unit 152.

Figure 5D:
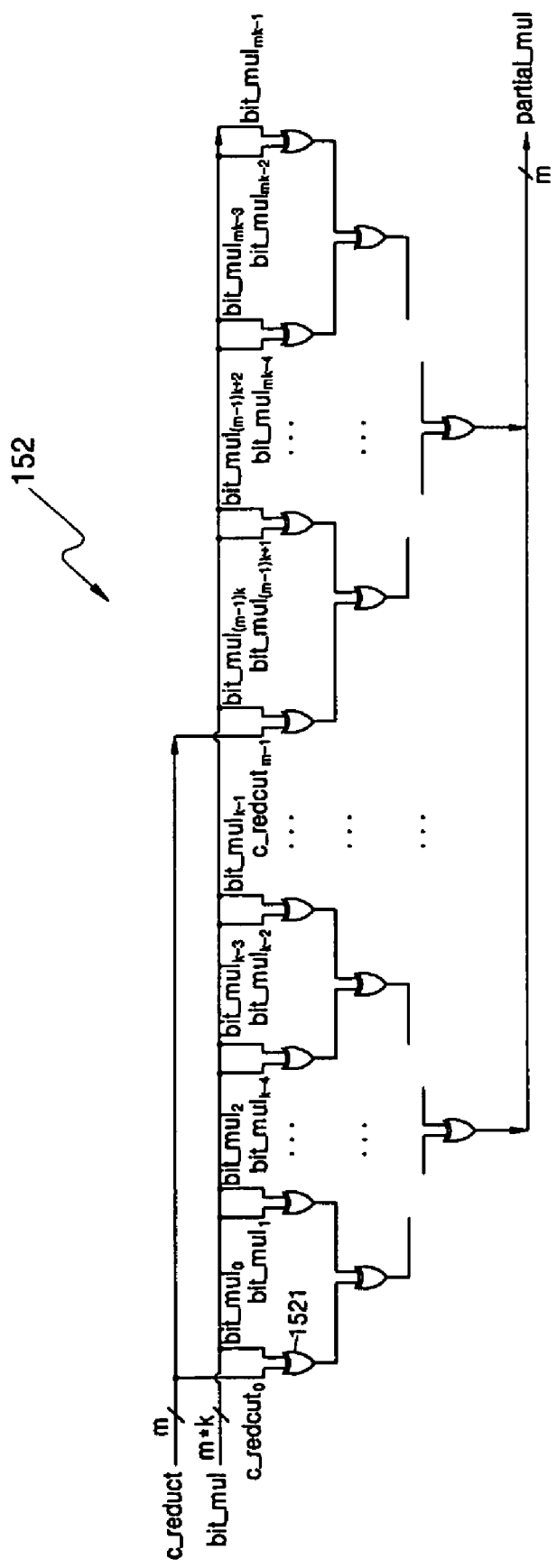
FIG. 5D is a diagram showing a detailed structure of a bit addition unit shown in FIG. 5A.

FIG. 5D is a diagram showing a detailed structure of the bit addition unit 152 shown in FIG. 5A.

The bit addition unit 152 is implemented by [m×k] XOR operation units 1521. In order to add each row element of the output value bit_mul of the bit multiplication unit 151, the bit addition unit 152 performs bit addition in units of k rows in operation S122, and at the same time, performs further addition of reduction calculation value c_reduct corresponding to each row. Reduction is performed in the reduction unit 17.

Figure 6:
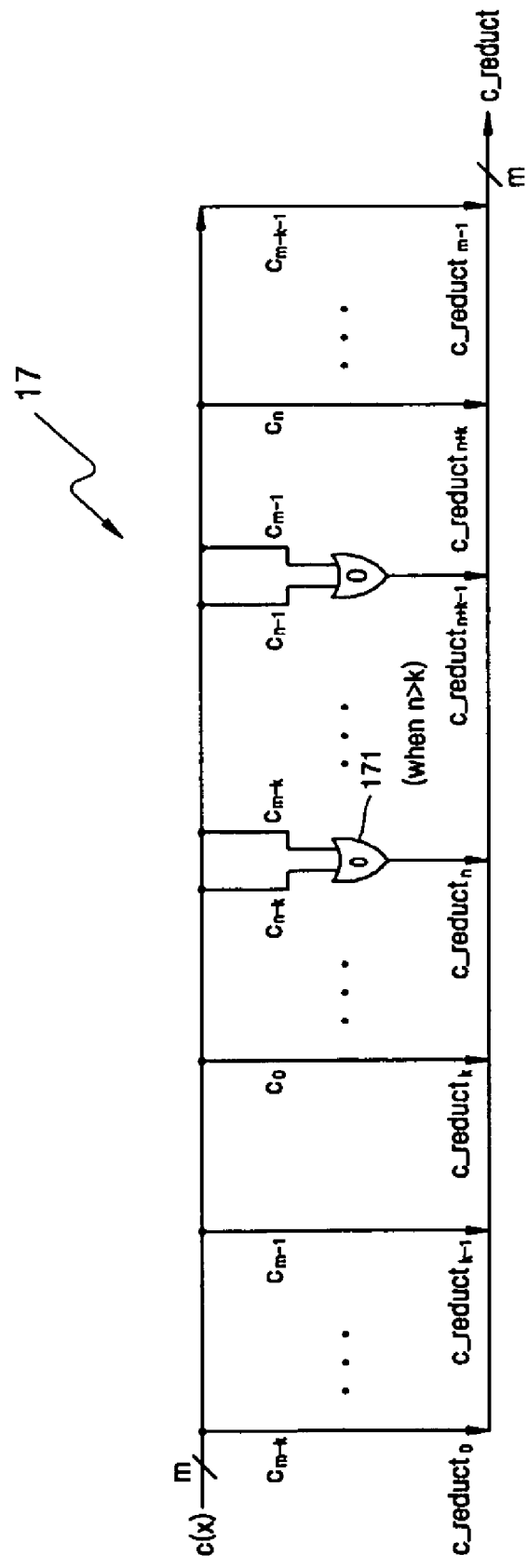
FIG. 6 is a diagram of a detailed structure of a reduction unit shown in FIG. 1A.

FIG. 6 is a diagram of a detailed structure of a reduction unit shown in FIG. 1A.

The reduction unit 17 is implemented by k XOR operation units 171 and signal line mapping as shown in FIG. 6. The reduction unit 17 receives pre-calculated partial multiplication result value partial_mul fed back, performs a reduction operation according to the equation 5, and outputs the reduction value c_reduct in operation S13. The partial multiplication result value partial_mul is stored in register C 16 and in the next partial multiplication, is reduced and added. If this process is repeatedly performed $\lceil m/k \rceil k-1$ times, the final multiplication result c(x) is stored in register C 16 and the multiplication result is output.

If the present invention is used, in $GF(2^m)$ defined as irreducible polynomial $x^m+x^n+1 (1 \geq n \geq m/2)$, trade-off between the area and the operation speed of the multiplication apparatus can be achieved such that efficient performing the multiplication is enabled. In particular, this enables an efficient implementation of an elliptic curve cryptosystem using a large m value.

While the present invention has been particularly shown and described with reference to exemplary embodiments thereof, it will be understood by those of ordinary skill in the art that various changes in form and details may be made therein without departing from the spirit and scope of the present invention as defined by the following claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. An apparatus for hybrid multiplication comprising:
    a matrix Z generation unit generating a matrix Z of dimensions for the partial multiplication unit, wherein an m-bit multiplier a(x) and an m-bit multiplicand b(x) is multiplied from an coefficient matrix of a(x) in $GF(2^m)$, and wherein the m-bit multiplicand b(x) is divided by k bits ($k \leq \lceil m/2 \rceil$);
    a partial multiplication unit performing the partial multiplication $\lceil m/k \rceil k-1$ times in units of rows of the matrix Z to calculate an ($\lceil m/k \rceil k-1$)-th partial multiplication value and a final result value of the multiplication; and
    a reduction unit receiving the ($\lceil m/k \rceil k-1$)-th partial multiplication value fed back from the partial multiplication unit and performing reduction of the value in order to obtain a partial multiplication value next to the ($\lceil m/k \rceil k-1$)-th partial multiplication value.

2. The apparatus of claim 1, wherein the matrix Z is formed as the sum of a matrix X that is a matrix formed by obtaining 1st through m-th rows of the coefficient matrix, a matrix T that is a matrix formed by obtaining the (m+1)-th and higher rows of the coefficient matrix and setting the remaining rows to 0's, and a matrix U that is formed by shifting the matrix T down by n rows and setting the upper n rows to 0's.

3. The apparatus of claim 1, wherein the partial multiplication unit comprises:
    a bit multiplication unit performing bit multiplication of m rows of the matrix Z by each bit of the k bits; and
    a bit addition unit calculating the partial multiplication result value by performing bit addition of row elements of the bit multiplication result value and performing bit addition of the reduced values.

4. The apparatus of claim 1, wherein the partial multiplication is performed in units of high order k bits.

5. The apparatus of claim 1, wherein an element $Z_i$ of an arbitrary i-th row of the matrix Z is obtained only by signal line mapping.

* * * * *